(12) United States Patent
Vandrak

(10) Patent No.: US 8,863,736 B2
(45) Date of Patent: *Oct. 21, 2014

(54) GAS-FIRED HEATER WITH ENVIRONMENTAL DETECTOR

(75) Inventor: Brian S. Vandrak, Highland Heights, OH (US)

(73) Assignee: Enerco Group, Inc., Cleveland, OH (US)

(*) Notice: Subject to any disclaimer, the term of this patent is extended or adjusted under 35 U.S.C. 154(b) by 333 days.

This patent is subject to a terminal disclaimer.

(21) Appl. No.: 12/544,454

(22) Filed: Aug. 20, 2009

(65) Prior Publication Data

US 2010/0147291 A1 Jun. 17, 2010
US 2014/0230809 A9 Aug. 21, 2014

Related U.S. Application Data

(63) Continuation-in-part of application No. 12/441,462, filed on Feb. 9, 2010, now Pat. No. 8,434,469, which is a continuation-in-part of application No. 10/518,202, filed on Dec. 16, 2004, now Pat. No. 7,300,278, which is a continuation-in-part of application No. 10/605,486, filed on Oct. 2, 2003, now Pat. No. 6,884,065, which is a continuation-in-part of application No. 10/051,561, filed on Jan. 18, 2002, now Pat. No. 6,648,635, and a continuation of application No. 09/731,156, filed on Dec. 6, 2000, now Pat. No. 6,340,298.

(60) Provisional application No. 61/122,165, filed on Dec. 12, 2008, provisional application No. 60/169,062, filed on Dec. 6, 1999.

(51) Int. Cl.

| | |
|---|---|
| *F24C 3/04* | (2006.01) |
| *F24H 3/00* | (2006.01) |
| *F23N 1/10* | (2006.01) |
| *F23D 14/12* | (2006.01) |
| *F24H 1/00* | (2006.01) |
| *F24H 3/04* | (2006.01) |
| *F24C 3/14* | (2006.01) |
| *F24H 9/20* | (2006.01) |
| *F24C 3/12* | (2006.01) |

(52) U.S. Cl.
CPC ............ *F24H 9/2085* (2013.01); *F24H 3/0488* (2013.01); *F24C 3/14* (2013.01); *F24C 3/122* (2013.01)

USPC ................... 126/92 R; 126/91 R; 126/110 B; 431/80; 431/328; 432/222

(58) Field of Classification Search
USPC ............. 126/91 R, 92 R, 110 B; 431/80, 222; 432/222
See application file for complete search history.

(56) References Cited

U.S. PATENT DOCUMENTS

| | | |
|---|---|---|
| 1,639,780 A | 8/1927 | Mulholland |
| 3,139,879 A | 7/1964 | Bauer et al. |

(Continued)

FOREIGN PATENT DOCUMENTS

| | | |
|---|---|---|
| GB | 253043 | 6/1926 |
| JP | 54-116747 | 9/1979 |

(Continued)

OTHER PUBLICATIONS

O'Meara Camping Centers (web page), Cookers & Heaters, "Alvima Carasol 3b Heater", data sheets pp. 1-7, Jun. 26, 2002.

(Continued)

*Primary Examiner* — Kenneth Rinehart
*Assistant Examiner* — William Corboy
(74) *Attorney, Agent, or Firm* — Brouse McDowell; Michael G. Craig

(57) ABSTRACT

Provided is a portable heater supplied by an associated fuel source, comprising a housing, a fuel connection fitting, an orifice, a burner assembly, a regulator, a controller for selectively switching among operation states including at least a 4000 BTUs and a 9000 BTUs per hour state, a power source adapted to generate electrical power from heat, and a detector system adapted to use the electrical power generated by the power source, detect the level of a particular gas in the atmosphere, and interrupt combustion of the air-fuel mixture. A housing may comprise an air inlet and may define an interior region. A burner assembly may comprise a fuel valve adapted to control communication between the burner assembly and the associated fuel source, a venturi for mixing air and fuel into a fuel-air mixture, a combustion region adapted for the combustion of the air-fuel mixture to produce combustion products and heat.

20 Claims, 20 Drawing Sheets

(56) References Cited

U.S. PATENT DOCUMENTS

| | | |
|---|---|---|
| 3,590,806 A | 7/1971 | Locke |
| 3,814,573 A | 6/1974 | Karlovetz |
| D243,694 S | 3/1977 | Faulkner |
| 4,201,544 A | 5/1980 | Briggs et al. |
| 4,307,701 A | 12/1981 | Balon et al. |
| 4,340,362 A | 7/1982 | Chalupsky et al. |
| 4,348,172 A | 9/1982 | Miller |
| 4,640,680 A | 2/1987 | Schilling |
| 4,782,814 A | 11/1988 | Cherryholmes |
| 4,843,313 A | 6/1989 | Walton |
| 4,848,313 A | 7/1989 | Velie |
| 5,090,899 A | 2/1992 | Kee |
| 5,174,751 A | 12/1992 | Chapman et al. |
| 5,239,979 A | 8/1993 | Maurice et al. |
| 5,470,018 A | 11/1995 | Smith |
| 5,546,925 A | 8/1996 | Knight et al. |
| 5,628,303 A | 5/1997 | Ahmady et al. |
| 5,645,043 A | 7/1997 | Long et al. |
| D391,345 S | 2/1998 | Mandir et al. |
| 5,807,098 A | 9/1998 | Deng |
| 5,838,243 A | 11/1998 | Gallo |
| 5,848,585 A | 12/1998 | Long et al. |
| 5,865,618 A | 2/1999 | Hiebert |
| 5,941,699 A | 8/1999 | Abele |
| 5,984,663 A | 11/1999 | Joyce |
| D445,889 S | 7/2001 | Resmo et al. |
| D447,796 S | 9/2001 | Resmo et al. |
| 6,340,298 B1 | 1/2002 | Vandrak et al. |
| 6,446,623 B1 | 9/2002 | Resmo et al. |
| 6,575,154 B1 | 6/2003 | Freeman et al. |
| 6,619,281 B2 | 9/2003 | Resmo et al. |
| 6,648,635 B2 | 11/2003 | Vandrak et al. |
| 6,742,814 B2 | 6/2004 | Resmo et al. |
| 6,792,937 B2 | 9/2004 | Resmo et al. |
| 6,843,244 B2 | 1/2005 | McCalley et al. |
| 6,884,065 B2 | 4/2005 | Vandrak et al. |
| 8,434,469 B2 | 5/2013 | Vandrak |
| 2004/0096790 A1* | 5/2004 | Querejeta et al. ............... 431/80 |
| 2005/0037303 A1* | 2/2005 | Bachinski et al. ............... 431/80 |
| 2005/0257786 A1* | 11/2005 | Vandrak et al. ............. 126/91 R |

FOREIGN PATENT DOCUMENTS

| | | |
|---|---|---|
| JP | S54-116747 | 9/1979 |
| JP | 55-051233 | 4/1980 |

OTHER PUBLICATIONS

Dynamx Incorporated Warehouse Appliance (web page), Williams Heaters—Vent-Free Honts,, .... Models, data sheets pp. 1-4, Jun. 26, 2002.

AGA, American Gas Association, Fact Sheet, "Oxygen Depletion Sensing (ODS) Systems":/ Dec. 1984.

Bullfinch (Gas Equipment) Limited, The Simba Range Ultra Safe-Low Cost Mobile Cabinet Heaters, 2 pages, undated.

Brians of Sheerness, Valor Fires, data sheets pp. 1-2, Mar. 6, 2002.

Mobil Mobile Gas Supplies, Thurcroft Stove, data sheets pp. 1-2, Mar. 6, 2002. e Gas Supplies, Thurcroft Stove, data sheets pp. 1-2.

The Coleman Co., Inc., 3000 BTU Propane Catalytic Heater, instructions for use pp. 1-4, undated.

Mobile Gas Supplies, Mobile Heaters, data sheets pp. 1-4, Mar. 6, 2002.

Notification of Transmittal of the International Search Report and The Written Opinion of the International Searching Authority dated Jun. 14, 2005.

PCT International Search Report and the Written Opinion of the International Searching Authority from International Application No. PCT/US2007/07426 mailed on Sep. 28, 2007.

* cited by examiner

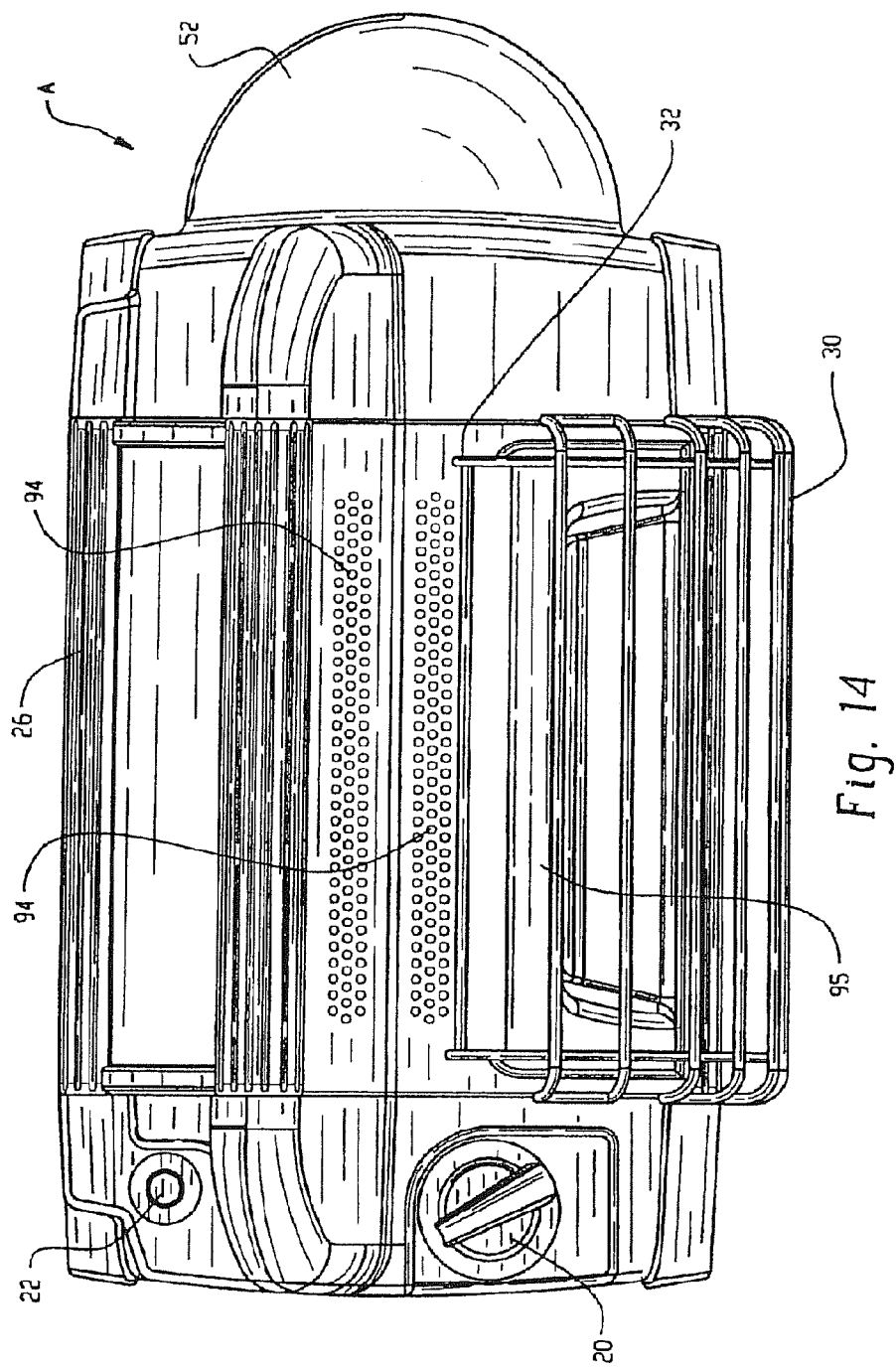

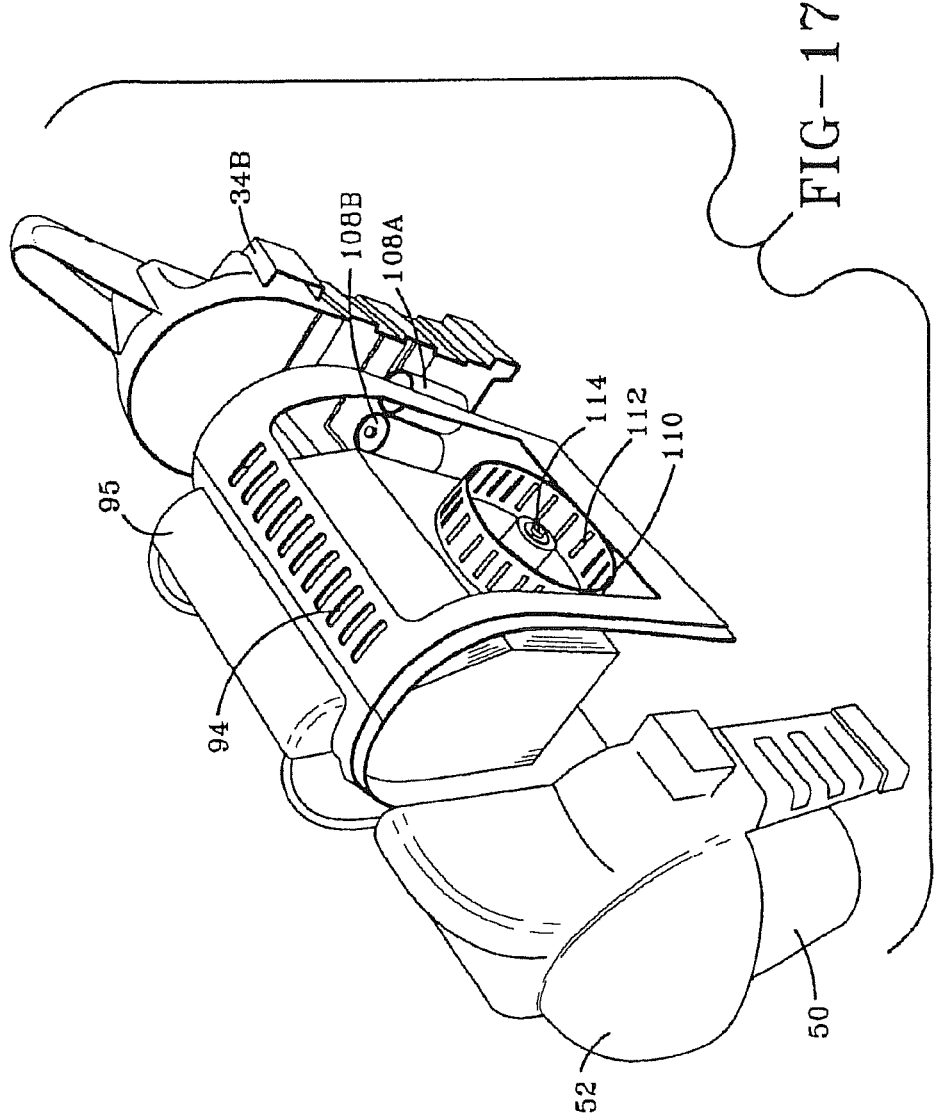

GAS-FIRED HEATER WITH ENVIRONMENTAL DETECTOR

This application claims priority to provisional application Ser. No. 61/122,165, filed Dec. 12, 2008, which is incorporated herein by reference; and this application claims the benefit of, and is a continuation-in-part of, U.S. patent application Ser. No. 12/441,462, now U.S. Pat. No. 8,434,469, filed Mar. 26, 2007, which is a continuation-in-part of U.S. patent application Ser. No. 10/518,202, now U.S. Pat. No. 7,300,278, filed Sep. 30, 2004, which is a continuation-in-part of U.S. patent application Ser. No. 10/605,486, now U.S. Pat. No. 6,884,065, filed Oct. 2, 2003, which is a continuation-in-part of U.S. patent application Ser. No. 10/051,561, now U.S. Pat. No. 6,648,635, filed Jan. 18, 2002, which is a continuation application of U.S. patent application Ser. No. 09/731,156 filed on Dec. 6, 2000, now U.S. Pat. No. 6,340,298, which is a non-provisional patent application of U.S. Patent Application Ser. No. 60/169,062, filed Dec. 6, 1999.

TECHNICAL FIELD

Provided is a gas-fired heater comprising a carbon dioxide detector. More particularly, provided is gas-fired heater comprising a carbon dioxide detector-based safety shut-off valve.

BACKGROUND

Gas-fired portable heaters are well known in the art and are used in multiple environments. The heater typically includes a housing having a chamber. The housing has an inlet for receiving air into the chamber. Gas is introduced into the chamber to be mixed with the air in order to complete combustion and provide an infrared heating surface. A plenum directs the heat toward a mesh screen and distributes it over the surface thereof.

The use of such heaters is strictly regulated for outdoor only use due to the emission of carbon monoxide and other potentially harmful combustion products. Prior designs in existing portable units are subject to a wide variety of problems. The prior designs are not safe or certified to operate in small recreational enclosures such as tents, truck-caps, fishing huts, trailers, vans, etc. There are many reasons why the devices found in the prior art are not adequate to perform in such environments. Some previous designs do not have the ability to meet safety regulations regarding combustion requirements at a high and low firing condition and at a reduced pressure. Some designs do not possess an oxygen depletion system ("ODS"). Some designs do not measure or respond to undesirable carbon dioxide levels. These shortcomings have prevented many portable heaters from adequately performing in small recreational and temporary work enclosures.

Therefore, it remains desirable to provide a portable gas-fired heater capable of performing safely in small recreational enclosures and temporary work enclosures.

SUMMARY

Provided is a portable gas-fired heater comprising a housing, a burner assembly, and a carbon dioxide detector system. The housing is adapted to at least partially enclose a fuel source. The burner assembly is enclosed by said housing.

Provided is a portable gas-fired infrared heater comprising a housing, a regulator, burner assembly, a radiant surface, a plenum chamber, and a carbon dioxide detector system. The housing comprises a handle adapted for transporting the heater and an air inlet. The regulator is adapted to limit the pressure of a fuel source to approximately eleven inches water column. The burner assembly is mounted within the housing. The burner assembly comprises a fuel valve adapted to control communication with a fuel source, and a venturi for mixing air from the air inlet and fuel from the fuel valve into a fuel-air mixture. The radiant surface is recessed into the housing. The radiant surface is disposed at an angle to vertical and comprises a rear face. The plenum chamber is adjacent to the radiant surface, is in communication with said radiant surface, and is adapted to distribute said fuel-air mixture onto the rear face of the radiant surface. The carbon dioxide detector system is adapted to shut off the fuel valve in response to detection of a predetermined level of carbon dioxide.

Provided is a portable gas-fired radiant heater comprising a housing, a fuel source, a fuel connection fitting, an air inlet, a burner assembly, a radiant surface, and an automatic shutoff mechanism. The fuel connection fitting is pivotably adjustable between an in-use position and a replacement position. The burner assembly is mounted within the housing. The burner assembly comprises a fuel valve adapted to control communication with said fuel source. The radiant surface is in the housing. The radiant surface is adapted to function as a combustion site. The automatic shutoff mechanism is operatively associated with the burner assembly for shutting off the fuel valve in response to a detection of a predetermined level of carbon dioxide.

BRIEF DESCRIPTION OF THE DRAWINGS

FIG. 14 is a top view of one embodiment of a portable heater;

FIG. 17 is a top perspective exploded view of one embodiment of a portable heater;

DETAILED DESCRIPTION

Figure 1:
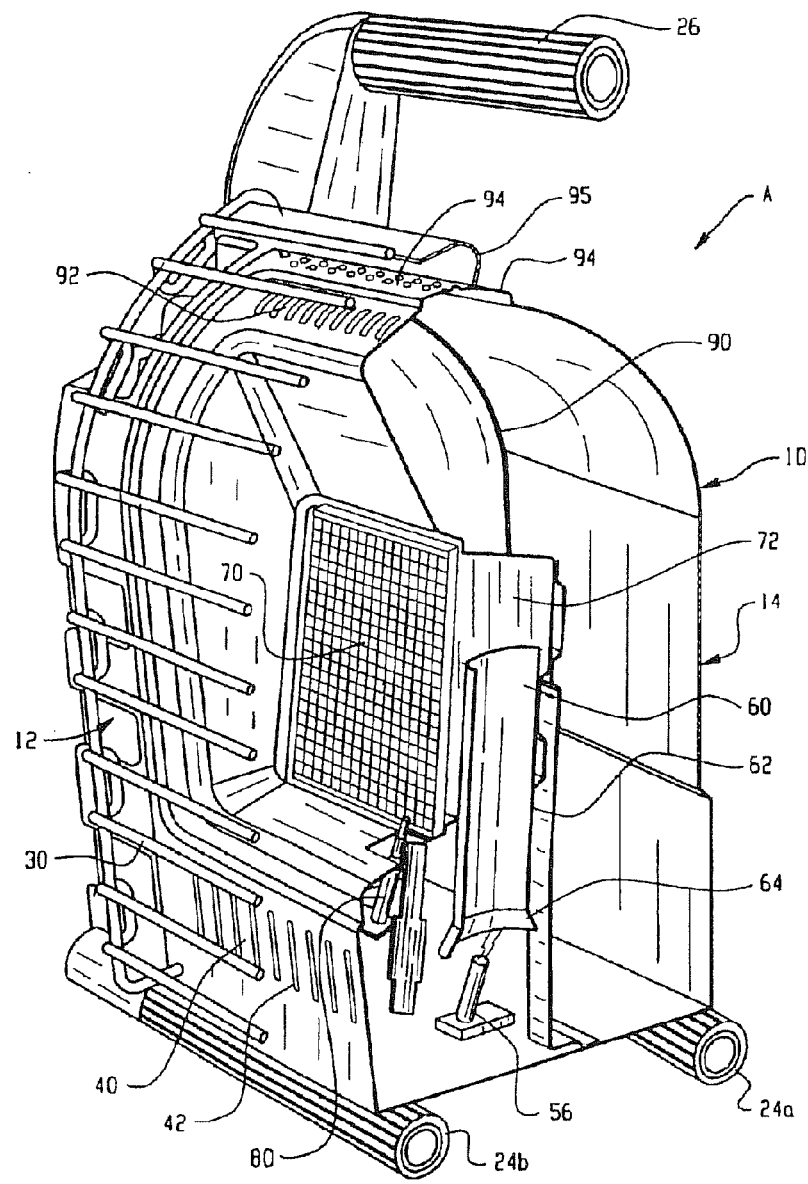
FIG. 1 is a perspective cross-sectional view of one embodiment of a heater assembly.
Figure 2:
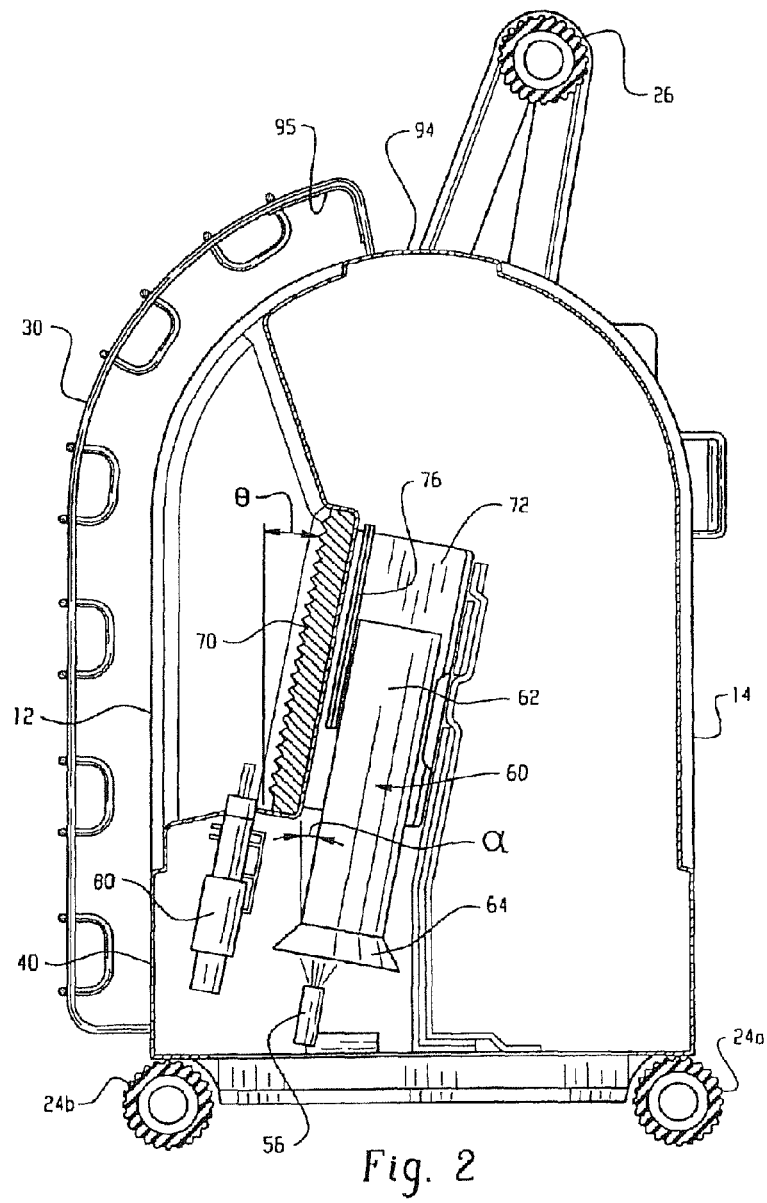
FIG. 2 is a longitudinal cross-sectional view of one embodiment of a heater assembly.

Referring now to the drawings wherein the showings are only for purposes of illustrating certain embodiments of the heater, and not for purposes of limiting same, the Figures show a portable heating device A adapted for use in small enclosed environments.

Referring, without limitation, to the embodiment depicted in FIGS. 1-27, the portable heater A includes a housing 10 having a front face 12, a rear face 14, and two sides 16, 18. The housing 10 may be manufactured to have smooth contours to prevent snagging or catching of things such as clothing, fabric, etc. A stepped recess or external cavity may be formed in a corner region of the left side 16 of the housing 10 for supporting a control knob or temperature controller 20. A recess provides protection against inadvertent contact and accidental changing of the temperature. In certain embodiments, the temperature controller 20 has four positions: off, pilot, low, and high (not shown) In certain embodiments, the temperature controller 20 has continuously variable positions for infinitely variable heating. A controller may incorporate a piezo spark igniter integral to controller stem rotation.

In certain embodiments, a recess is disposed on the upper back corner of the left side 16 of the housing 10. This recess supports an igniter button 22 for activating the heater A. This recess also protects against inadvertent contact with the igniter button 22.

In certain embodiments, the heater A is supported by two elongated legs 24a, 24b laterally disposed along the outboard edges of the rear face 14 and front face 12 respectively. The legs 24a, 24b may be grooved to provide a friction surface to contact a supporting surface and may extend over the entire width of the housing to provide a wide "footprint" and stable support area for the heater. In another embodiment (not shown), additional legs extending front to rear are provided beneath legs 24a, 24b to increase air flow beneath the heater. A handle 26 extends from the top of the heater. In certain embodiments the handle 26 forms an angle directed away from the front face 12. In certain embodiments this angle is approximately 15°. An angle allows the handle 26 to remain cool for handling by a user as the angled orientation of the handle 26 protects the user's hand from heat exiting the top of the heater A while the user transports the heater A. In the alternative, a non-angled handle (not shown) provides a grip surface for carriage of the heater. The handle 26 may optionally be grooved to provide an enhanced gripping surface for the user.

In certain embodiments, a shield or metal grid 30 is attached to the front face 12 of the heater to provide protection to the heater components. In addition, the shield prevents accidental contact with the hot portions of the heater front face 12. The shield may be made from elongated wire or metal strips. In certain embodiments, peripheral pieces of the shield may be received in openings 32 in the housing to secure the shield to the heater. In certain embodiments, keyhole openings or recesses 34a, 34b are located on the upper portion of the back face 14 of the heater allowing the user to hang the heater.

The air inlet 40 may be any opening that adequately provides air inflow. In certain embodiments, an opening or air inlet 40 is disposed on a lower portion of the front face 12 of the heater for receiving and filtering air drawn into the housing. In certain embodiments the air inlet is formed from a series of elongated slits 42 spaced across the housing beneath the shield.

Figure 5:
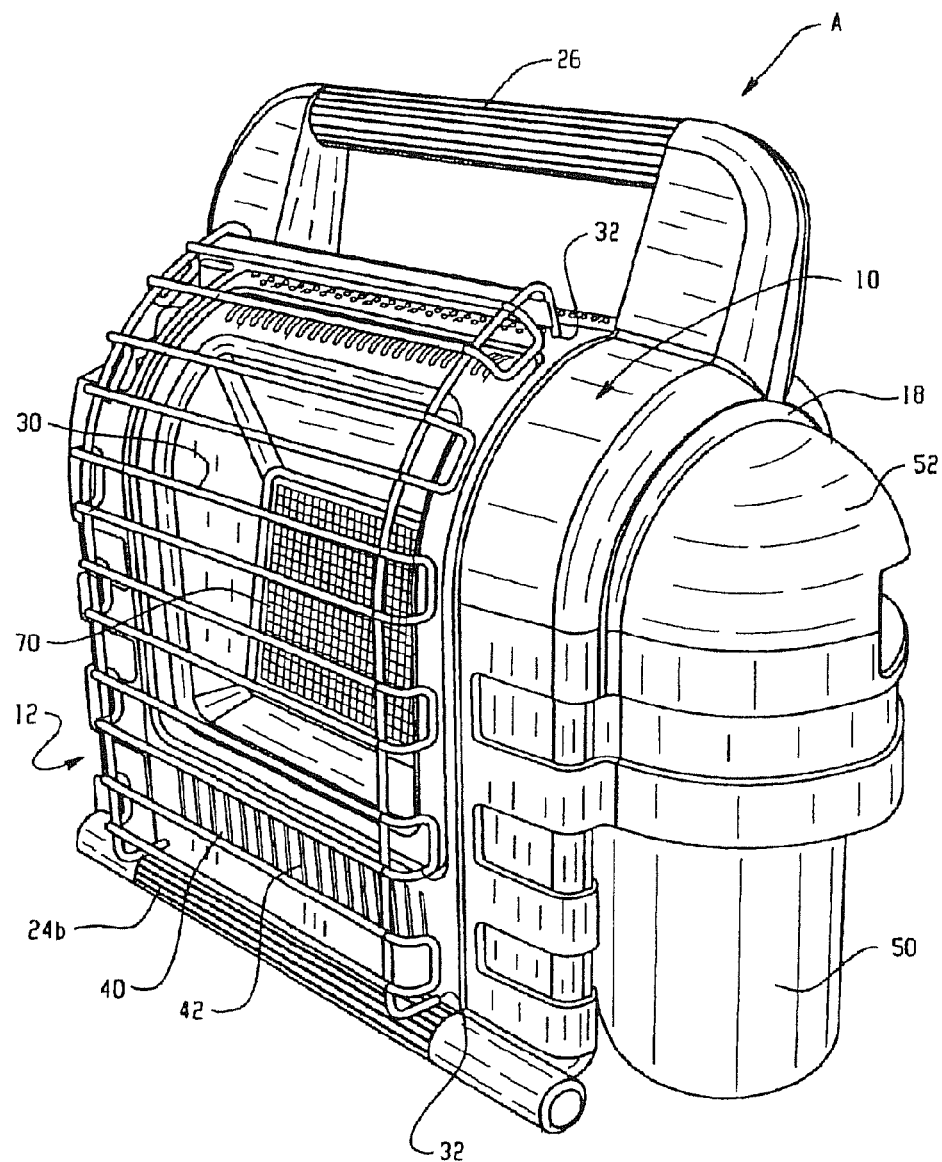
FIG. 5 is a perspective view of one embodiment of a heater taken generally from the front and right-hand side.
Figure 6:
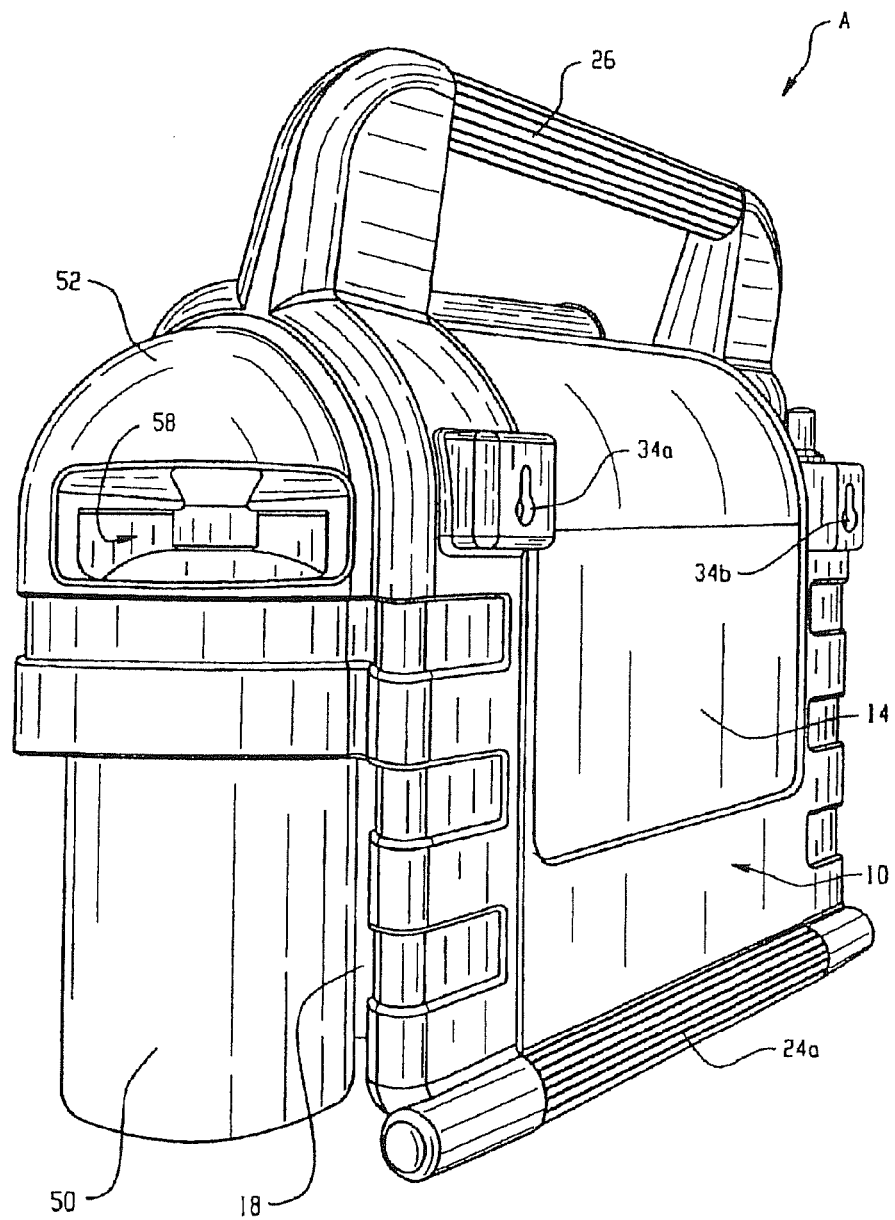
FIG. 6 is a perspective view of one embodiment of a heater taken generally from the rear and right-hand side.
Figure 7:
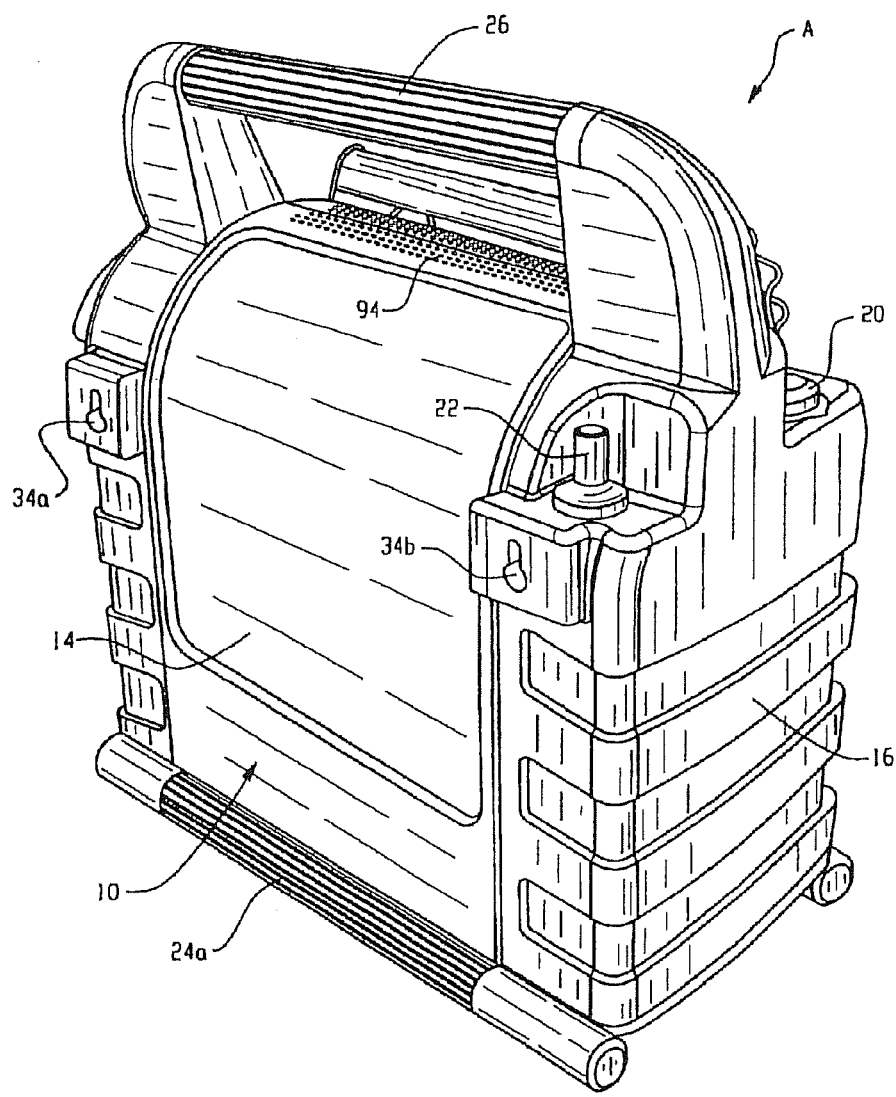
FIG. 7 is a perspective view of one embodiment of a heater taken generally from the rear and left-hand side.
Figure 8:
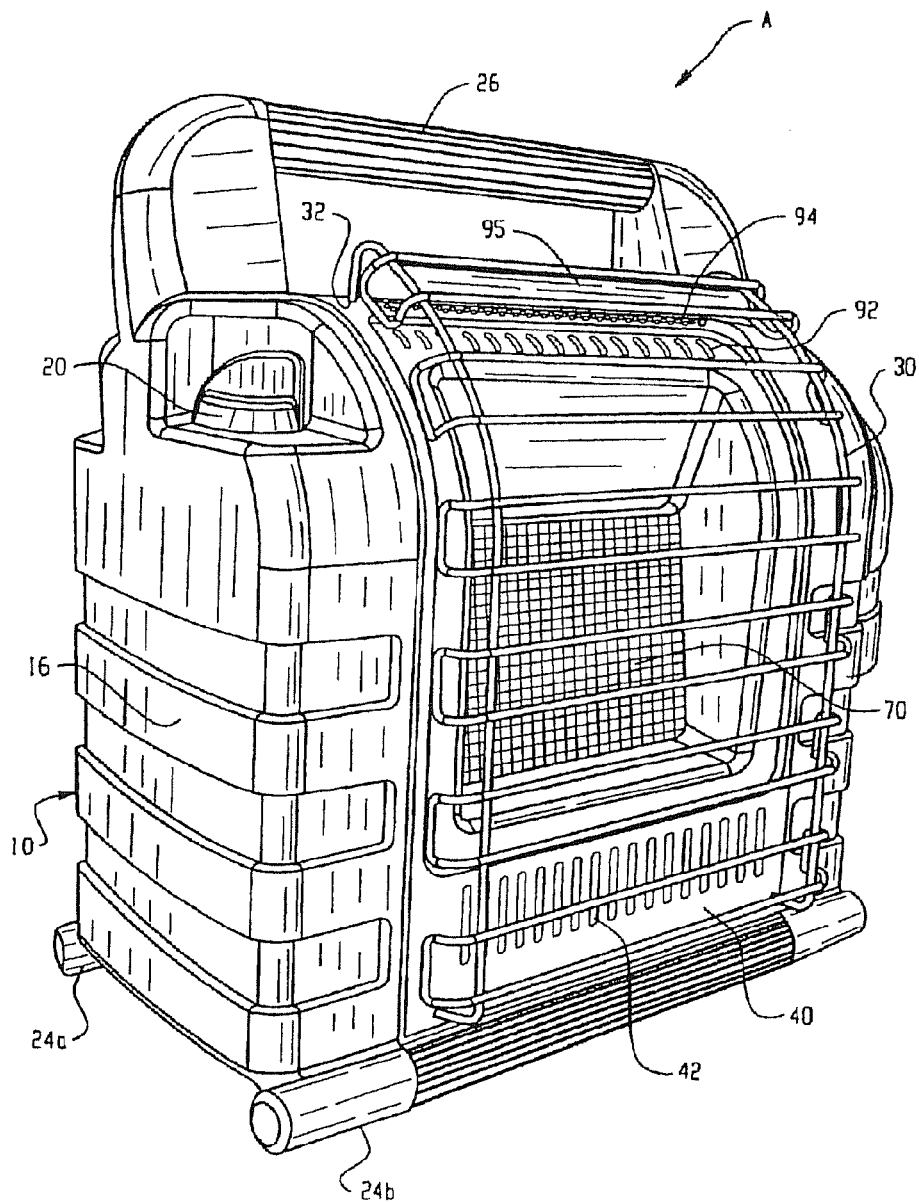
FIG. 8 is a perspective elevational view of one embodiment of a heater.
Figure 9:
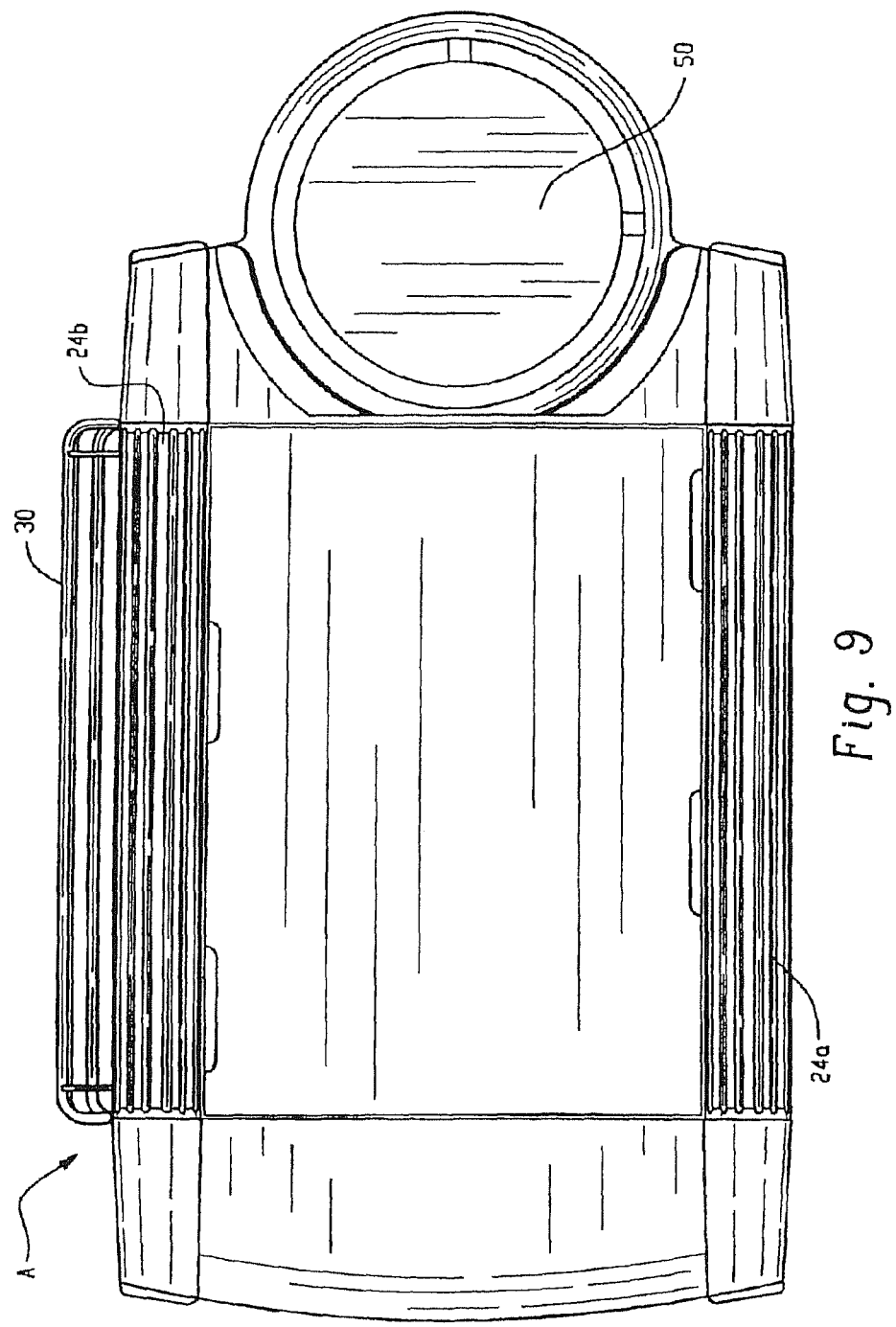
FIG. 9 is a bottom view of one embodiment of a portable heater.
Figure 10:
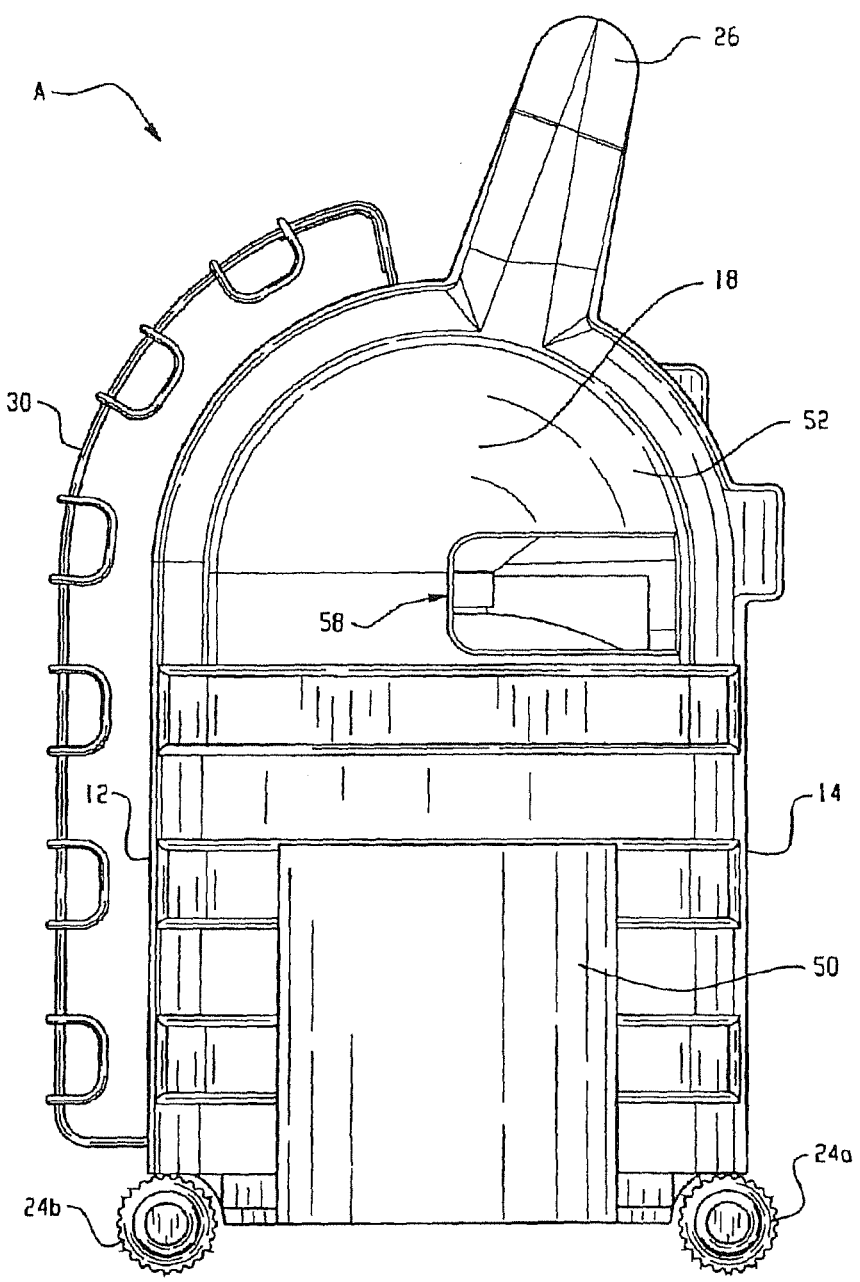
FIG. 10 is a side elevational view of one embodiment of a portable heater.
Figure 11:
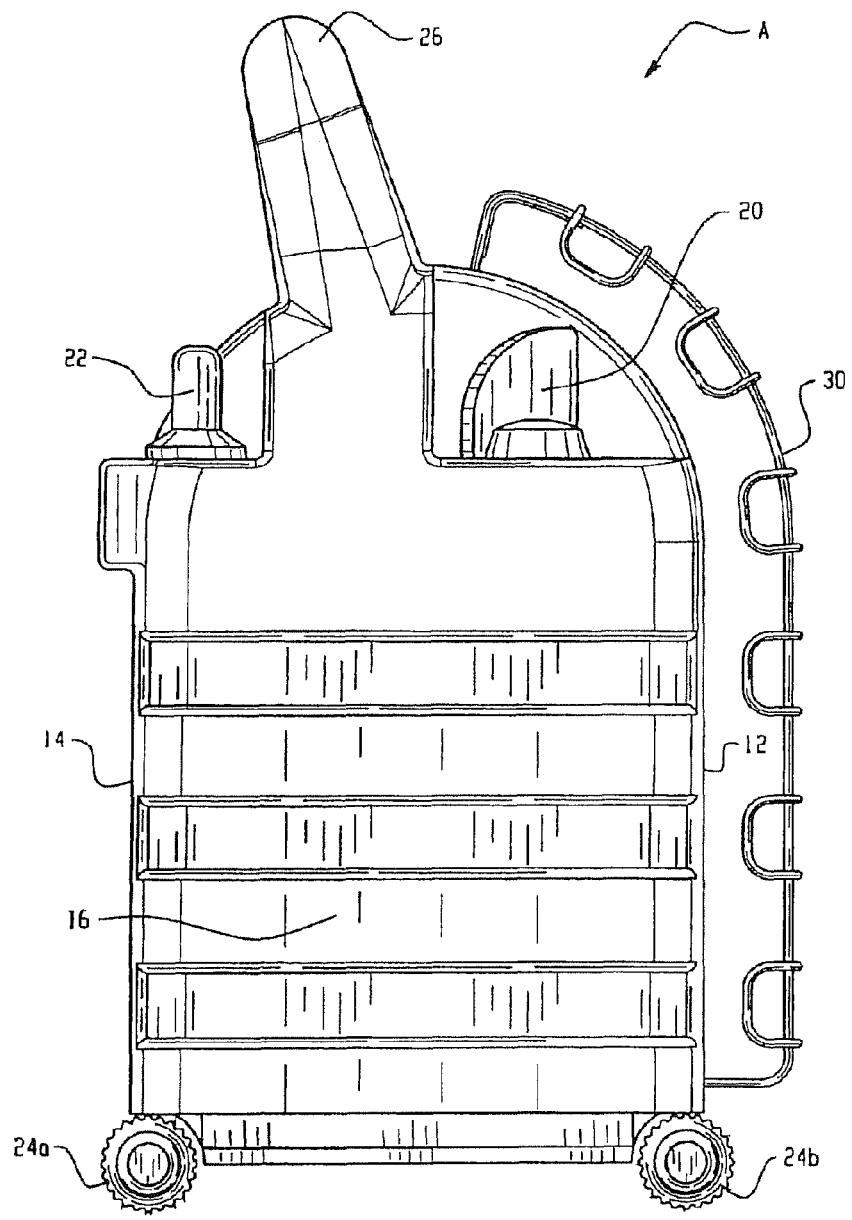
FIG. 11 is a side elevational view of one embodiment of a portable heater.
Figure 12:
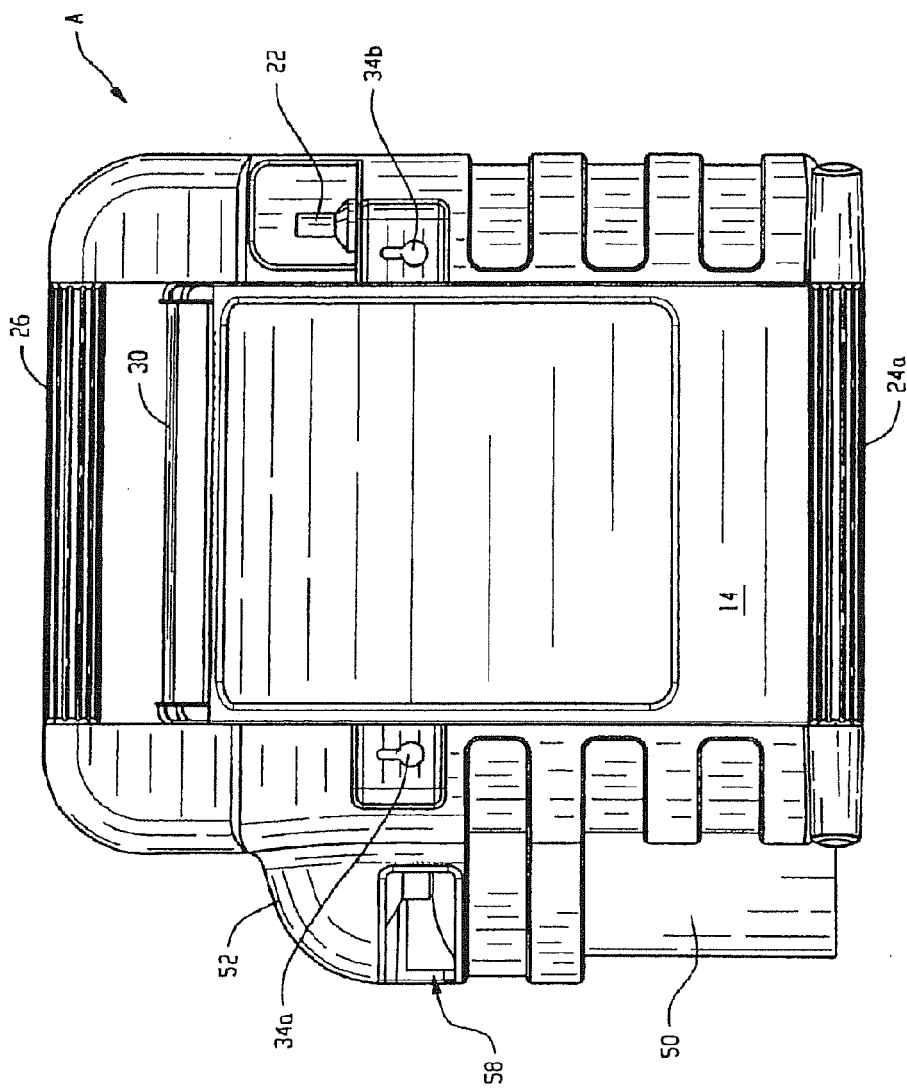
FIG. 12 is a rear elevational view of one embodiment of a portable heater.
Figure 13:
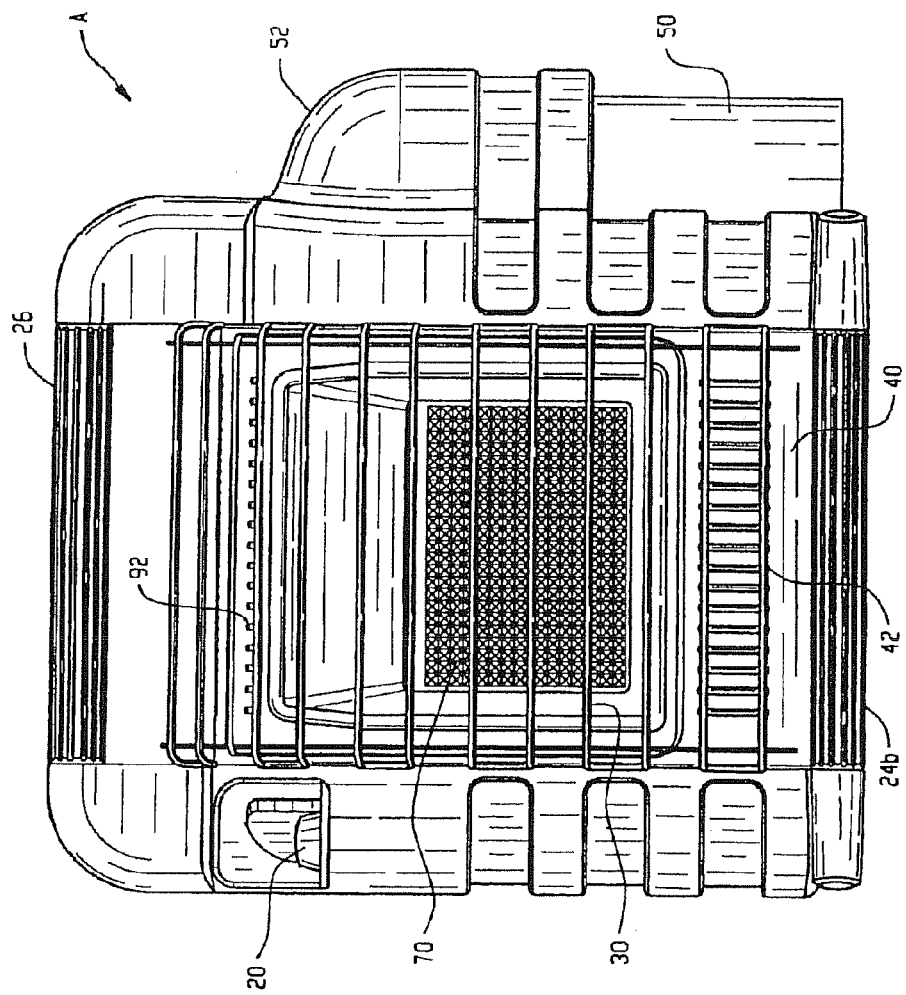
FIG. 13 is a front elevational view of one embodiment of a portable heater.

In certain embodiments, an LP ("Liquefied Petroleum" or "Liquefied Propane") gas supply 50 is secured to and partially enclosed by the housing 10 (See FIGS. 5 and 6). An LP gas supply 50 may be a removable canister or propane tank that can be replaced by a new tank or removed, refilled, and re-installed in the housing. In certain embodiments, an LP gas supply comprises a one pound propane cylinder. In certain embodiments, a dome 52 protrudes from the side 18 of the housing 10 and partially encloses the gas supply tank 50. The dome acts as a protective shroud to cover the interconnection of the tank with the housing. In certain embodiments, an LP gas supply comprises a twenty pound propane tank. Without limitation, a twenty pound propane tank may be connected to the heater by length hose so that the tank can be located away from the heated region. Without limitation, a hose connected propane tank can be positioned outside a tent, cabin, fishing shanty garage, etc. while the heater is located within the structure.

The gas supply 50 is connected to a regulator which connects to a valve and orifice 56 (See FIG. 1) which is selectively adjustable between open and closed positions, access being provided to the regulator through window opening 58 for remote LP gas supply hose tightening and leak checking (see FIG. 6). Optionally the LP gas supply hose 130 with connector fittings 132, 134 is stored underneath the unit within receptacles 136 in combination with side ledges 138 illustrated in FIG. 27. It is recognized that the LP couplings may be "quick connects" when the supply pressure is already regulated to about 11" water column. In this embodiment, the quick-coupler hose is integral to the heater and downstream from heater regulator(s) but before the control valve to facilitate connection to a regulated hose supply from an external fuel source such as a 20 pound cylinder. Similarly, the regulated fuel supply (11" water column) could originate from a self-contained system as in a recreational vehicle. The quick-coupler hose connection would incorporate positive fuel shut-off in both male and female connection components to prevent fuel escape when disconnected.

Referring again to FIGS. 1 and 2, a burner venturi 60 is enclosed within the housing 10 and operates to mix oxygen and propane for combustion. The burner venturi 60 has a hollow generally cylindrical body 62 and a tapered mouth 64 having a wider diameter than the body 62. The burner venturi is disposed at an angle a relative to the longitudinal axis of the heater A. The mouth 64 of the burner venturi is positioned on approximately the same axial plane as the air inlet 40 and the cylindrical body 62 extends upwardly from the mouth 64. The orifice 56 which is attached to the gas supply 50 is located directly beneath the mouth 64 of the burner venturi 60.

Also located within the housing A is a generally planar radiant surface 70 disposed at an angle a relative to the longitudinal axis of the heater. A rear face of the radiant surface is in communication with a cavity or plenum chamber 72. The burner plenum receives the air/gas mixture from the venturi and distributes the mixture over and through the rear face of the radiant surface. Thus, in operation, the orifice 56, attached to the gas supply, is opened releasing a fuel gas such as propane into the mouth 64 of the burner venturi 60. Associated with the orifice is a regulator that reduces the delivery pressure of the fuel gas from the tank (rated up to 150 psi) to eleven inches of water column in one stage. Thus, this portable heater operates at a significantly lower pressure than existing commercially available units. The stream of gas exiting the orifice 56 creates a vacuum effect drawing air from the air inlet 40 into the mouth 64 of the burner venturi. Propane and air are thoroughly mixed in the burner venturi 60 and plenum 72 in order to achieve complete combustion and produce a clean burning infrared heating surface. The mixture of oxygen and propane travels upward through the cylindrical body 62 of the burner venturi 60 until reaching the plenum chamber 72. To prevent the mixture of propane and oxygen from immediately exiting the plenum chamber 72, a solid baffle 76 is provided which forces the air/gas mixture downward into communication with the rear face of the radiant surface.

The radiant surface may be a burner tile or a multi-ply screens (not shown) that define a plurality of small openings which permit combustion of the air/gas mixture as it passes therethrough. A means is provided for initially sparking or igniting the mixture at the radiant surface. In the present invention a container 80 houses the pilot 82 and the igniter 84 (see FIG. 3) which provides the initial sparking. It will be appreciated that any conventional means for initially sparking or igniting the mixture can be utilized. Combustion of the air/gas mixture is maintained and reaches elevated temperatures of approximately 1200° F. The heater shown in the drawings with one propane cylinder is rated at a minimum 4000 BTUs and a maximum 9000 BTUs at eleven inches water column pressure. Other ratings are also potential alternatives, including up to 20,000 to 25,000 BTU models when more than one propane cylinder and associated burner assemblies are utilized.

A reflector 90 extends outwardly from the top of the burner plenum 72 at an angle directed toward the top portion of the front face 12 of the housing 10. The natural convective upward path of the combustion products leads the combustion products into contact with the reflector 90. The reflector 90, in addition to directing the radiant energy output from the heater toward the front surface of the housing, also acts as a deflector and reduces the temperature of the combustion products exiting the heater which greatly reduces the chance for ignition of a combustible material if it comes into contact with the heater. An outlet 92 is disposed near the top of the housing 10 allowing warm air to mix with combustion products and exit the device after contacting the reflector 90. In addition, a deflector 95 is disposed on the top of front face 12 which reduces the temperature of the combustion products exiting the heater which greatly reduces the chance for ignition of a combustible material if it comes into contact with the heater A.

In addition, there is an outlet or grate 94 disposed rearward of outlet 92 that communicates with the interior of the housing. It provides a continuous flow path for air (that does not enter the venturi) to flow from the inlet 40 around the rear of the plenum chamber and exit the housing rearward of the deflector. This enhances the chimney effect as described above since a large amount of ambient air is drawn into the housing, a portion used for combustion purposes and the remainder convects upwardly along the rear of the plenum and the deflector to exit via the openings 94. The air inlet 40 of the present invention is designed to encourage air flow along the back of the hot burner plenum 72, advantageously resulting in an increased velocity of air flow to the burner venturi, as well as cooling the rear housing 10. As the burner venturi 60 is heated, the thermal convection properties urge the air/gas mixture through the upwardly angled burner venturi 60 creating a chimney type effect. The chimney effect created by the present invention increases the fresh air flow velocity into the burner venturi, enabling the pressure from the gas supply 50 to be reduced, yet burn efficiently on high or low settings.

In certain embodiments the heater may comprise carbon dioxide detector system. A carbon dioxide detector system comprises a carbon dioxide detector; carbon dioxide detector may be of any type. A carbon dioxide detector system comprises a computer. Without limitation, a computer may comprise a PC board, an electronic chip, or a microcomputer. A carbon dioxide detector system comprises a power supply element selected from the group consisting of a battery, a power cord configured to plug into a source of electricity, a thermopile, thermoelectric generator and combinations thereof. Without limitation, the batteries comprising the a power supply may comprise two (2) "D" Cell batteries or any combination of quantity and different cell sizes.

A carbon dioxide detector system provides a safety function by operating to shut off the fuel supply at a some predetermined operational state or gaseous range (%). In certain embodiments, the carbon dioxide detector system performs the following operations: 1) produce atmospheric carbon dioxide data by measuring the carbon dioxide in the atmosphere using the carbon dioxide detector 2) produce atmospheric oxygen data by calculating an atmospheric oxygen level from the atmospheric carbon dioxide data using the computer, 3) compare atmospheric oxygen data to a predetermined atmospheric oxygen level, 4) If the atmospheric oxygen data is less than the predetermined atmospheric oxygen level, discontinue a signal output ("open valve signal") necessary to keep a normally closed safety valve open. In the described embodiment, if the atmospheric oxygen data is less than the predetermined atmospheric oxygen level the safety valve is closed due to lack of the open valve signal.

The predetermined atmospheric oxygen level may be any oxygen level. In certain embodiments the predetermined atmospheric oxygen level is at least 18%.

In certain embodiments, a carbon dioxide detector system safety interlock functionality is included whereby interruption of the functionality of a carbon dioxide detector system results in the safety valve being closed due to removal of a signal necessary to keep it open. In certain embodiments, if the carbon dioxide detector system is de-energized by removal, disruption, or failure of the power supply element, the open valve signal will be discontinued, thereby closing the safety valve.

In certain embodiments a carbon dioxide detector system may operate in conjunction with a standing pilot and safety valve. Without limitation, in certain heaters comprising a carbon dioxide detector system operable in conjunction with a standing pilot and safety valve, a flame from the standing pilot is controlled by the carbon dioxide detector system. When the atmospheric oxygen data is equal to or above the predetermined atmospheric oxygen level, the carbon dioxide detector system maintains the flame in a state to heat a thermocouple to produce the open valve signal needed to keep the safety valve open. When the atmospheric oxygen data is less than the predetermined atmospheric oxygen level, the carbon dioxide detector system will interrupt the open valve signal. Interruption of the open valve signal may be by opening a circuit, imposing an opposite or reverse potential on a circuit to suppress the signal carried thereby, or discontinuation of the signal production. Without limitation, one way to discontinue signal production in a system in which a flame is maintained in a state to heat a thermocouple to produce the open valve signal needed to keep the safety valve is by interrupting the flame.

Figure 3:
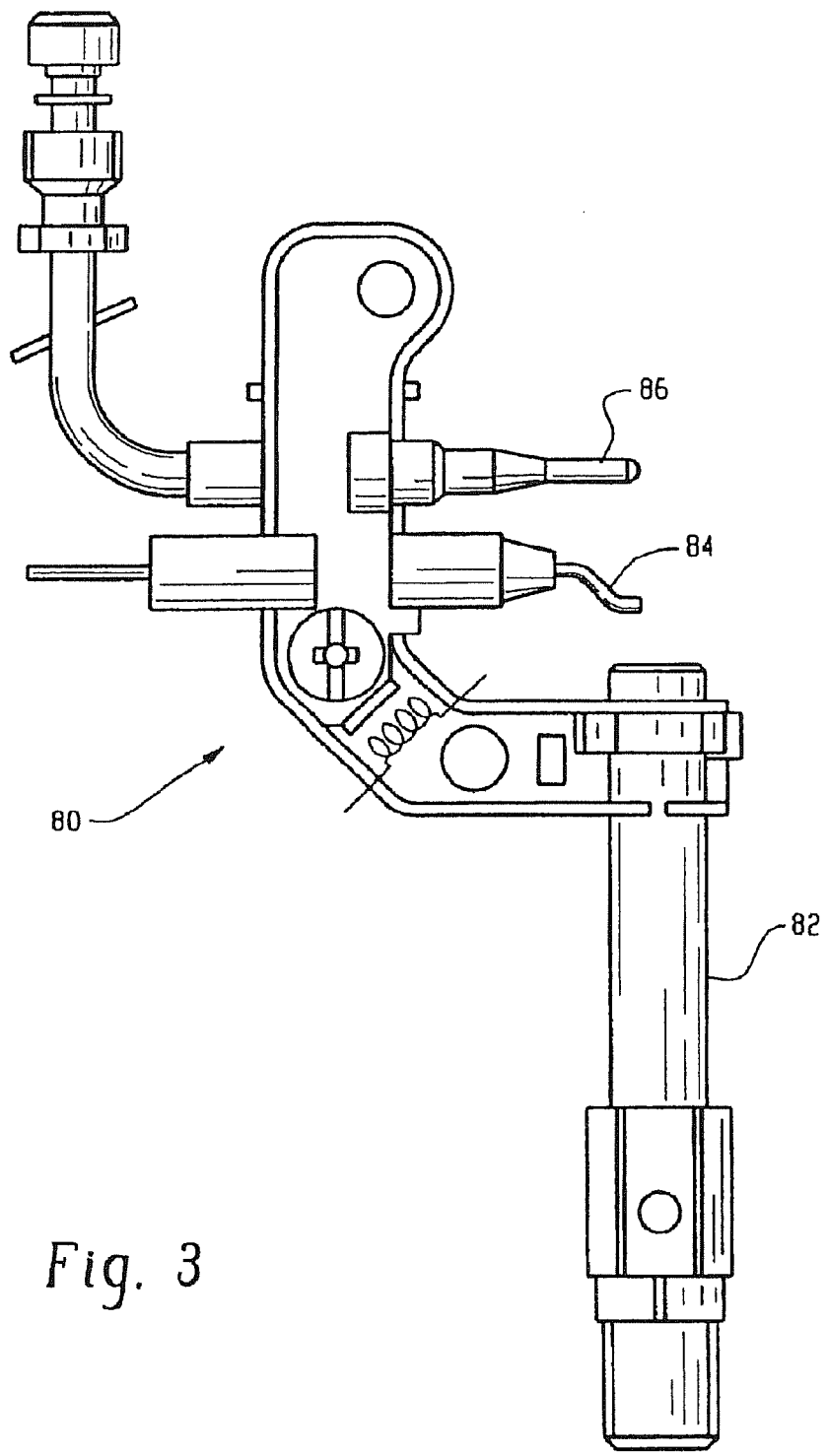
FIG. 3 is an enlarged elevational view of one embodiment of a thermocouple, spark igniter, and pilot tube assembly.
Figure 4:
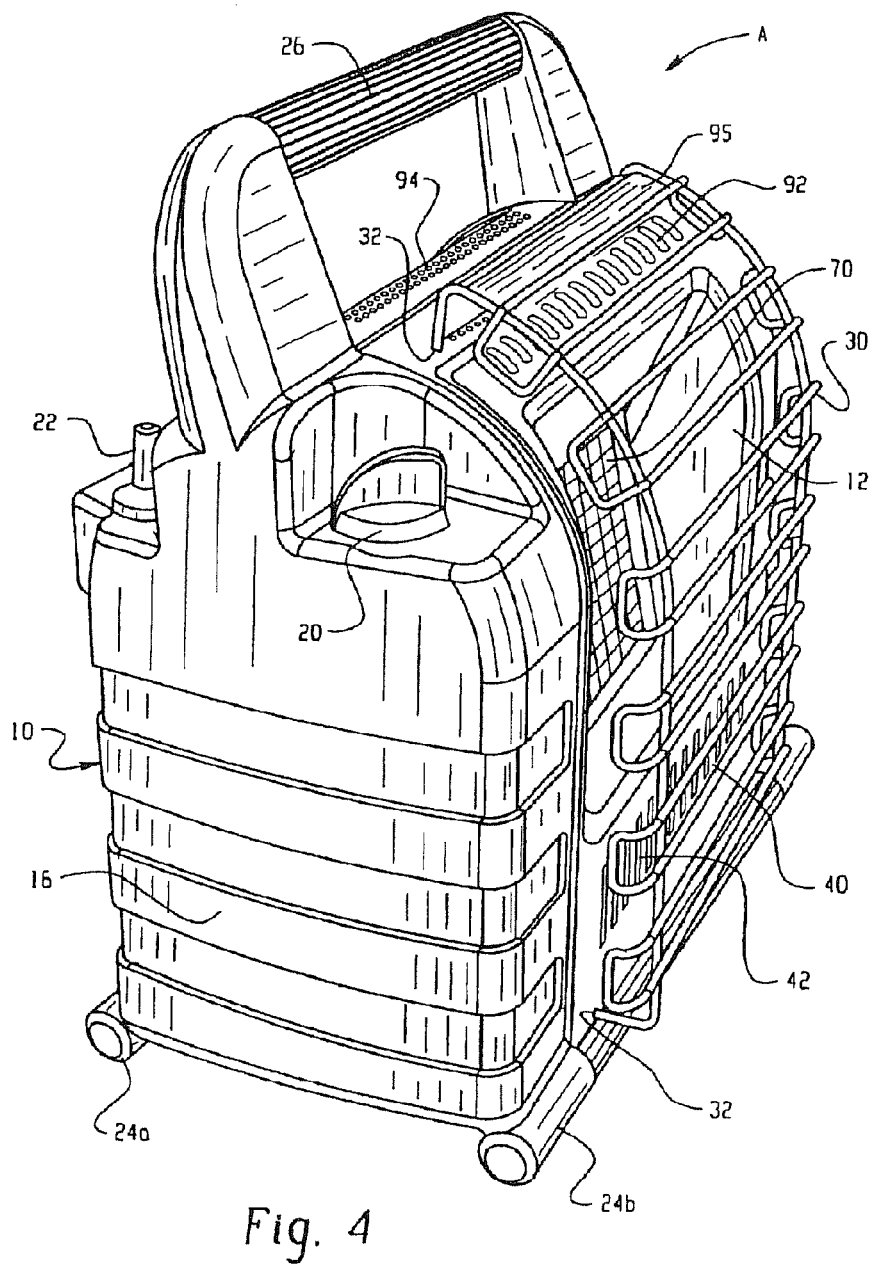
FIG. 4 is a perspective view of one embodiment of a heater taken generally from the front and left-hand side.

In addition to housing the pilot 82 and the igniter 84, the container 80 preferably houses an oxygen depletion system (See FIG. 3). The oxygen depletion system (ODS) provides an automatic shutoff mechanism when decreased oxygen levels and resulting increased carbon monoxide concentrations are detected. For example, the heater of the present design is intended to automatically shut off at 100 PPM of carbon monoxide at 18% oxygen levels (21% free normal air). A thermocouple 86 monitors changes in temperature of the pilot flame which indicates changes in oxygen and carbon monoxide levels. Previous designs found in the prior art use a thermocouple/plunger type safety shut-off arrangement, which is not deemed to be as sophisticated or precise as the ODS of the present invention. The addition of an ODS to portable unvented heaters is an improvement in the art and the first of its kind. A more detailed discussion of the ODS can be found in a variety of resources.

The present invention significantly reduces the pressure from the propane tank in one stage. The pilot burner must operate at 11" water column (W.C.) while the main burner may optionally operate at this same pressure although higher pressures are envisioned. This is the first portable device for indoor use that the applicant is aware of that conforms to this standard. The portable heaters that exist today all operate at high pressures (on the order of 12 psi) and do not incorporate an ODS. In addition, the present device has the ability to pass combustion requirements at a low fire condition.

Figure 15:
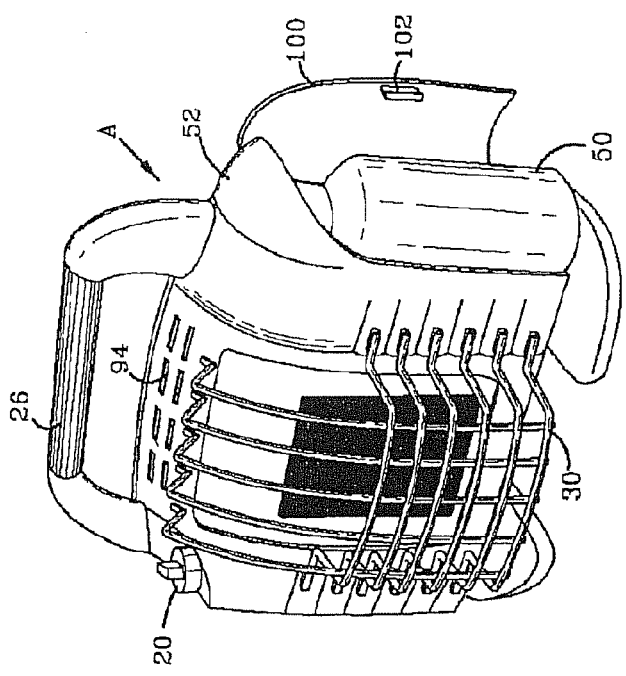
FIG. 15 is a perspective view of one embodiment of a portable heater.
Figure 16:
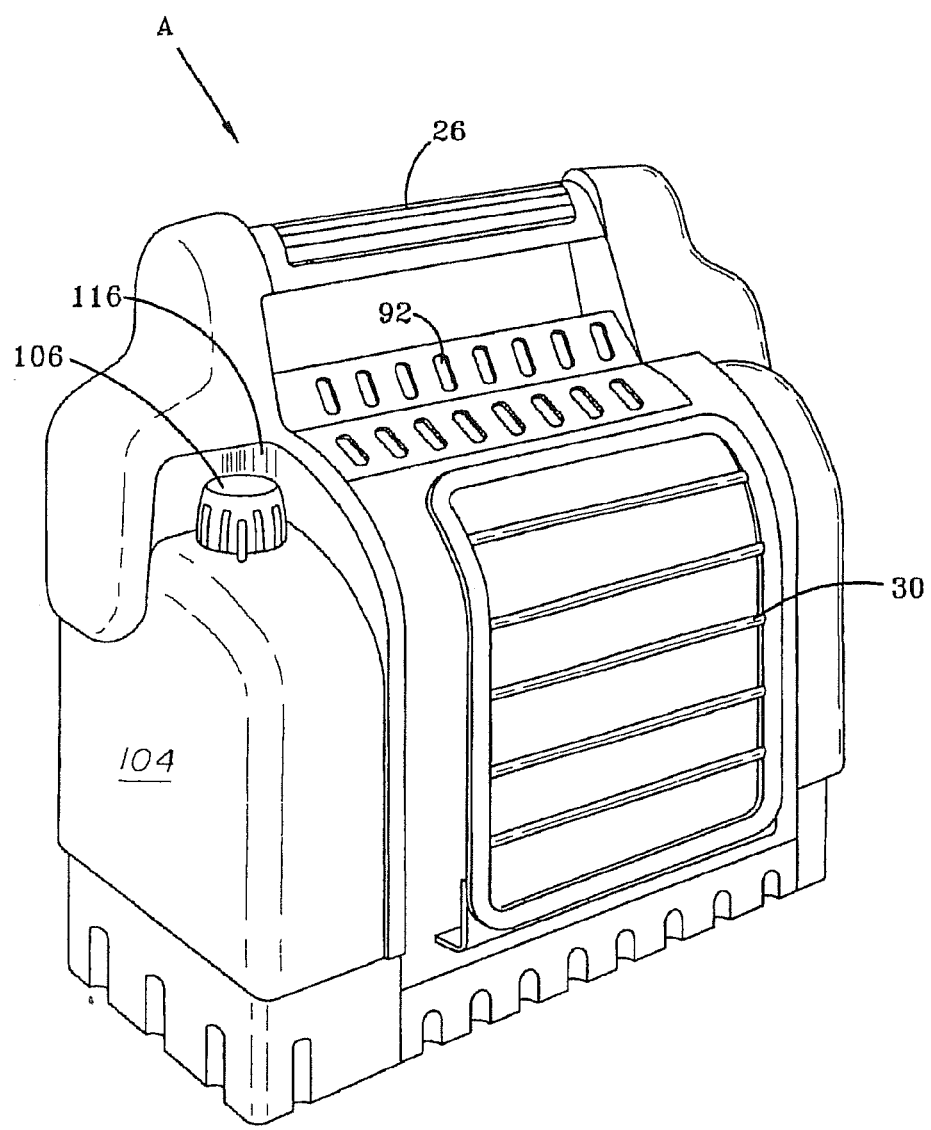
FIG. 16 is a perspective view of one embodiment of a portable heater.

In another embodiment of the invention illustrated in FIG. 15, the fuel source is positioned within housing 10 and is accessible through pivotable hinged door 100 with latch 102. Conical dome 52 extends partway down vertical side 18 and over at least a portion of the valve of fuel supply 50. Pivotal movement of hinged door 100 is accomplished by the user effecting vertical axial counterclockwise rotational movement about a pair of hinges or pivot axis (not shown) at one side of the door.

Figure 26:
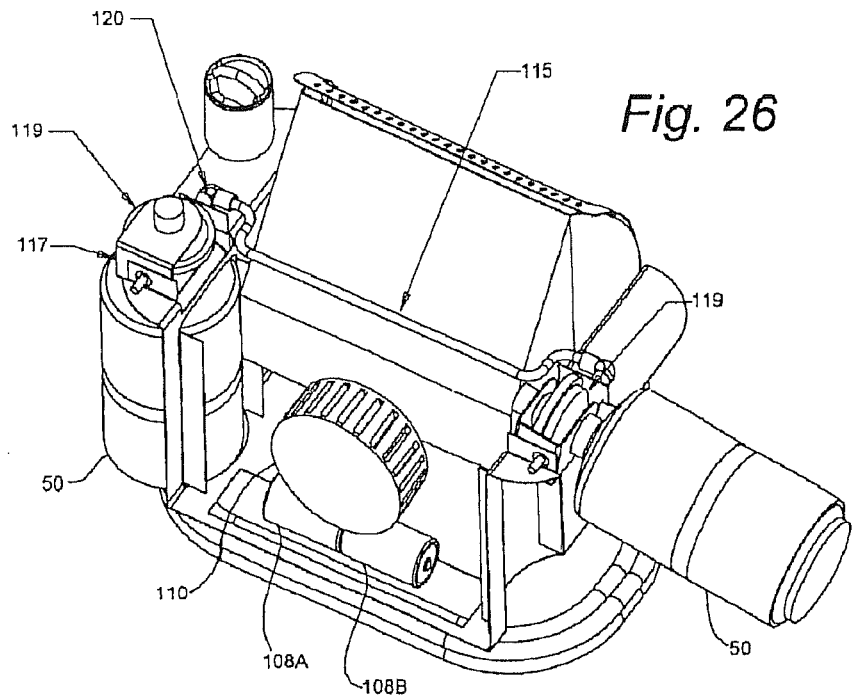
FIG. 26 is a rear perspective view with rear and side panels removed.
Figure 27:
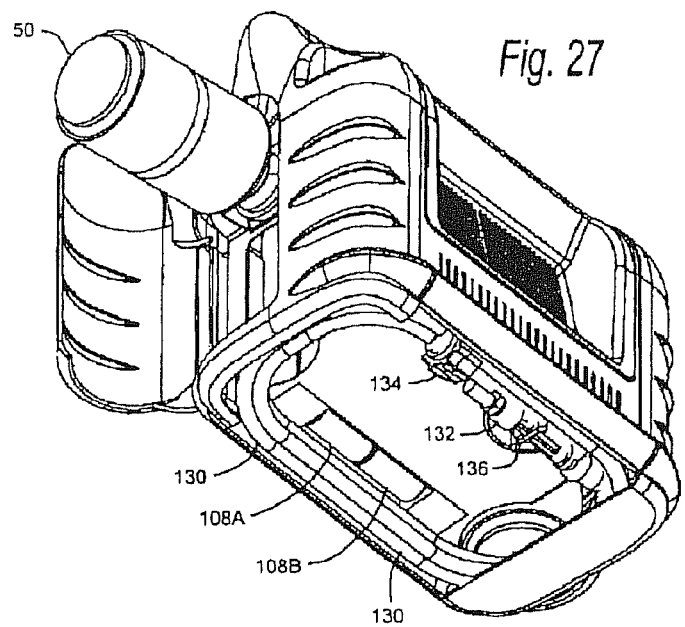
FIG. 27 is a bottom perspective view illustrating a remote LP gas supply hose.

FIG. 17 illustrates yet another embodiment of the invention in which improved air flow is effected through heater unit A by the incorporation of a paddle or cage fan 110 in back panel 14. In one aspect shown in FIG. 16, a rechargeable battery pack 104 is illustrated to be positionable within accommodating slot 116 within side panel 16 of housing 10. Knob 106 is used to variably define the power setting used with battery pack 104 as well as to be used as an "on/off" switch for controlling the speed of fan 110. Alternatively, and in another aspect of the invention, at least one, preferably two or more rechargeable dry cell batteries, 108a, 108b are employed within side panel 16 of housing 10 as better illustrated in FIG. 17. The batteries are positioned to be loaded from the bottom of housing 10 and, the power controlled by a variably positioned knob 106 located toward the front of housing 10 or at an alternative position as is known in the art for controlling variable amounts of power to an electrical device. Depending on the rotational speed of the fan desired, coupled with battery life expectancy, anywhere from one to four "C" or "D" sized batteries are employed, although it is equally envisioned that "AA" batteries may be used in some models where power consumption is envisioned to be minimal or usage infrequent and for short duration. Fan 110 has a plurality of paddles or inwardly extending panels for creating air movement through rotational pivotal movement about axis 114. The fan is typically a lower voltage fan, e.g., 3.0 volts, powered by a direct current motor. This increased air flow insures maximal cooling capacity on various metal and plastic components in heater A. Battery operation is also illustrated in FIG. 26 where an alternative dry cell location is identified.

Figure 19:
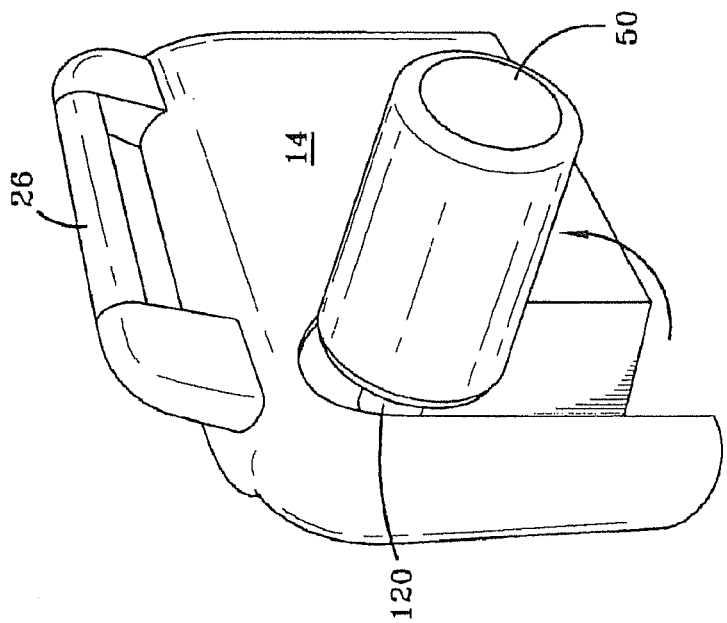
FIG. 19 is a perspective view of one embodiment of a portable heater.
Figure 18:
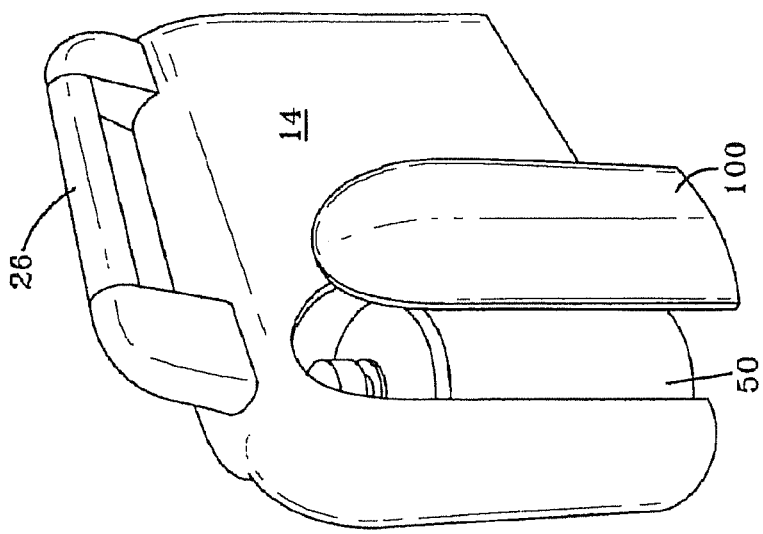
FIG. 18 is a perspective view of one embodiment of a portable heater.

FIGS. 18-19 illustrate another embodiment of the invention in which a snap-fit door 100 is removable from side panel 18 thereby permitting pivotal rotational movement from a first position to a second replaceable position of fuel source 50 by swivel fitting 120. This configuration allows an end-user to rotate the fuel source for easier canister replacement without having to simultaneously lift the unit. This pivotal coupling is additional illustrated in FIGS. 26-27 where one fuel source 50 is shown rotated approximately 90°. Pivotal movement is effected by rotatable fuel supply connection 120 feeding common fuel line 115. Propane cylinders are secured by threading engagement with regulator 119 held in position by sheet metal bracket 117 with pivot axis.

Figure 20:
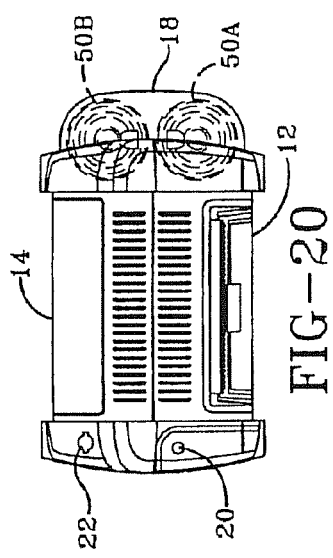
FIG. 20 is a top elevational view of one embodiment of a portable heater with handle and front grill removed.
Figure 21:
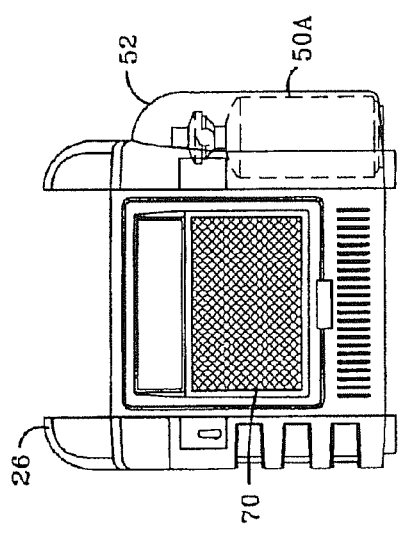
FIG. 21 is a front elevational view of one embodiment of a portable heater of FIG. 20 showing a fuel source in ghost lines.

FIGS. 20-27 illustrate yet another embodiment of the invention in which more than one fuel source is positionable within the housing. As illustrated in FIG. 20, two fuel sources 50a, 50b are positioned within side wall 18 and at least partially covered by dome-shaped shoulders, and in one aspect, completely enclosed therein as illustrated in FIG. 21. Temperature controller button 20 and igniter button 22 are positioned similarly to that shown previously in FIG. 4.

Figure 22:
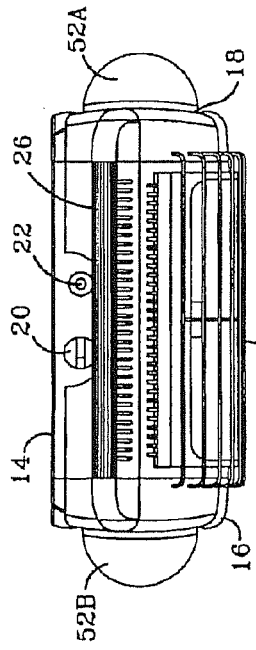
FIG. 22 is a top elevational view of one embodiment of a portable heater.
Figure 23:
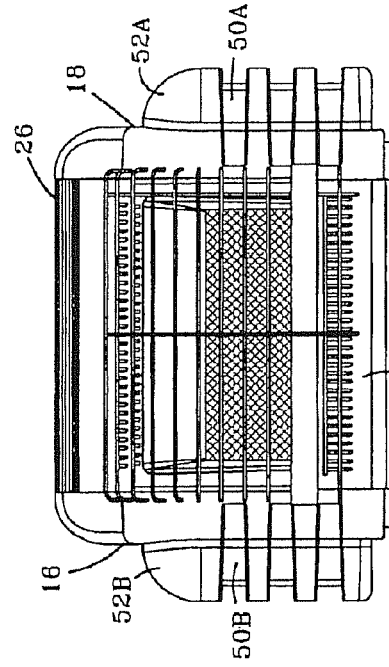
FIG. 23 is a front elevational view of FIG. 22.

In FIGS. 22-23, two fuel sources 50a, 50b which are at least partially enclosed by dome-shaped side panels 52a, 52b are positioned on opposed sides 18, 16 of heater housing 10. In this particular embodiment, the units are connected by a mixing valve (not shown) and the temperature controller button 20 and igniter button 22 operate to control a single burner unit.

Figure 24:
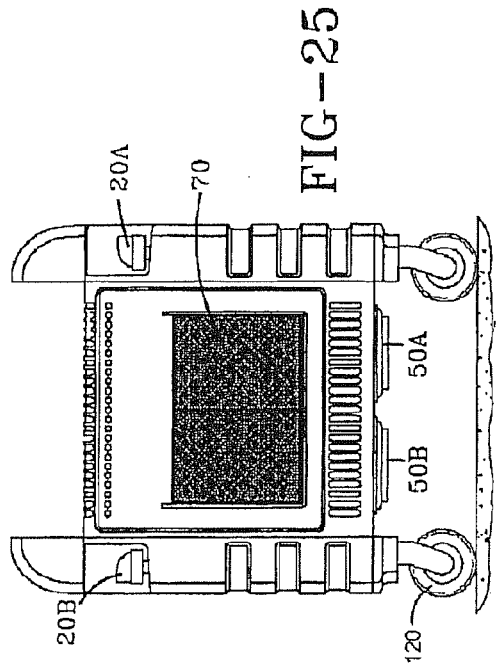
FIG. 24 is a top elevational view of one embodiment of a portable heater with handle and front grill removed.
Figure 25:
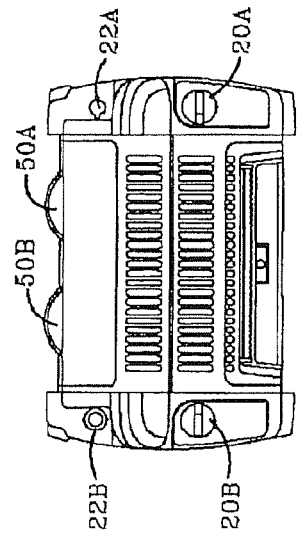
FIG. 25 is a front elevational view of FIG. 24.

In FIGS. 24-25, two fuel sources 50a, 50b are once again shown, the canisters protruding at least partially from the rear 14 of heater housing 10. As illustrated in this embodiment, each fuel source has its individual temperature controller buttons 20a, 20b and igniter buttons 22a, 22b for controlling the temperature of heater A.

It is recognized that when dual fuel source applications are discussed, it is recognized that the heat capacity of each burner need not be the same, and it is within the scope of this invention that different capacity burners are envisioned. For maximum heat control by the end-user, it is within the scope of the invention that one burner will be for "low" capacity applications and wherein the second burner will be for "high" capacity applications, and wherein the two burners can be used in combination to produce yet a higher capacity unit. For other applications, there will be two "low" capacity burners employed within one unit as well as applications where there will be two "high" capacity burners employed within the same unit. In a more expensive version of the heater, two continuously variable burners will be employed, such variability predicated by the rate at which fuel and/or air is supplied to the burners as well as the capacity of the burners.

It should be noted that in embodiments of this invention in which more than one fuel source is illustrated, that the fuel sources can either be operated in tandem or individually. When operated in tandem, a mixing valve is included prior to the burner. In some embodiments of the invention, the second location of the fuel source is that of a storage capacity only, and the unit operates as previously described. It should also be noted that the handle 26 illustrated in many of the embodiments, is often optional, and that a heater which achieves portability by the incorporation of wheels 120 positioned at the bottom of the unit, better illustrated in FIG. 25 is within the scope of this invention or wherein the portability is associated with the incorporation of a wheeled dolly-like apparatus. When the wheels are of fairly small size, the number of wheels is at least three, preferably 4 and they are pivotable about a vertical axis. When the number is three, the wheels are positioned in a triangular fashion with two wheels at opposed ends on one side, and a third wheel in the middle of the unit on an opposed side. When the number is four, the wheels are positioned at the vertices of the base of the unit. In a specialized configuration, the number of wheels can be reduced to two. When used in this manner, the wheels are more similar to rollers and occupy at least 50% of the width of the base, preferably more and extending essentially across a complete side, on both sides of the unit.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

While the gas-fired heater with carbon dioxide detector has been described above in connection with the certain embodiments, it is to be understood that other embodiments may be used or modifications and additions may be made to the described embodiments for performing the same function of the gas-fired heater with carbon dioxide detector without deviating therefrom. Further, all embodiments disclosed are not necessarily in the alternative, as various embodiments may be combined to provide the desired characteristics. Variations can be made by one having ordinary skill in the art without departing from the spirit and scope of the gas-fired heater with carbon dioxide detector. Therefore, the gas-fired heater with carbon dioxide detector should not be limited to any single embodiment, but rather construed in breadth and scope in accordance with the recitation of the attached claims.

I claim:

1. A portable heater supplied by an associated fuel source, comprising:
    a housing, said housing
        defining an interior region of the heater,
        comprising a top and a bottom,
        comprising an air inlet adapted to provide communication between the interior of the housing and the environment and adapted to provide a flow path to allow air to enter the housing;
    a fuel connection fitting adapted to provide fluid communication between said associated fuel source and said heater;
    an orifice;
    a burner assembly within the housing, said burner assembly comprising
        a fuel valve adapted to control communication between the burner assembly and the associated fuel source,
        a venturi for mixing air from the air inlet and fuel from the fuel valve into a fuel-air mixture; and
        a combustion region adapted for the combustion of said air-fuel mixture to produce combustion products and heat, said combustion region comprising,
        a rear face in communication with said venturi, and
        a radiant surface;
    a regulator operatively engaged between said fuel connection fitting and said burner assembly, said regulator adapted to provide a flow path adapted to pass fuel therethrough;
    a controller for selectively switching among operation states of the portable heater, wherein said operation states comprise,
        a first operational state wherein the heater is adapted to produce at least 4000 BTUs per hour, and
        a second operational state wherein the heater is adapted to produce at least 9000 BTUs per hour;
    a power source,
        wherein said power source comprises, a thermopile, a thermoelectric generator, or combinations thereof,
        said power source being adapted to generate electrical power from said heat; and
    a detector system adapted to detect the level of a particular gas in the atmosphere, wherein said particular gas in the atmosphere is carbon dioxide,
        said detector system adapted to interrupt combustion of said air-fuel mixture if levels of the particular gas in the atmosphere are within a predetermined range,
        said detector system adapted to use electrical power generated by said power source,
        said detector system comprising
            a standing pilot.

2. The portable heater according to claim 1, wherein said fuel connection fitting is pivotably adjustable between an in-use position and a replacement position.

3. The portable heater according to claim 1, said housing adapted to at least partially enclose a fuel source.

4. The portable heater according to claim 1, said regulator adapted to limit the pressure of fuel passing therethrough to approximately eleven inches water column.

5. The portable heater according to claim 1, wherein said fuel source comprises an LP gas supply, a removable canister, or a propane fuel tank.

6. The portable heater according to claim 1, wherein said housing comprises:
    a handle adapted for transporting the heater.

7. The portable heater according to claim 1, wherein said heater comprises an igniter.

8. The portable heater according to claim 1, wherein said radiant surface comprises:
    a burner tile or multi-ply screen.

9. The portable heater according to claim 6, wherein said housing comprises:
    a shield or grid adapted to provide protection to the heater components.

10. The portable heater according to claim 1, wherein said controller has continuously variable positions for infinitely variable heating.

11. A portable heater supplied by an associated fuel source, comprising:
    a housing, said housing
        defining an interior region,
        comprising a top and a bottom,
        comprising an air inlet adapted to provide communication between the interior of the housing and the environment and adapted to provide a flow path to allow air to enter the housing;
    a fuel connection fitting,
        said fuel connection fitting adapted to provide communication between said associated fuel source and said heater,
        said fuel connection fitting pivotably adjustable between an in use position and a replacement position;

an orifice;
a burner assembly within the housing, said burner assembly comprising
   a fuel valve adapted to control communication between the burner assembly and the associated fuel source,
   a venturi for mixing air from the air inlet and fuel from the fuel valve into a fuel-air mixture; and
   a combustion region adapted for the combustion of said air-fuel mixture to produce combustion products and heat, said combustion region comprising,
      a rear face in communication with said venturi, and
      a radiant surface;
a regulator operatively engaged between said fuel connection fitting and said burner assembly, said regulator adapted to provide a flow path adapted to pass fuel therethrough;
a controller for selectively switching among operation states of the portable heater, wherein said operation states comprise,
   a first operational state wherein the heater is adapted to produce at least 4000 BTUs per hour, and
   a second operational state wherein the heater is adapted to produce at least 9000 BTUs per hour;
a power source,
   wherein said power source comprises, a thermopile, a thermoelectric generator, or combinations thereof,
   said power source being adapted to generate electrical power from said heat; and
a detector system adapted to detect the level of a particular gas in the atmosphere, wherein said particular gas in the atmosphere is carbon dioxide,
   said detector system adapted to interrupt combustion of said air-fuel mixture if levels of the particular gas in the atmosphere are within a predetermined range,
   said detector system adapted to use electrical power generated by said power source,
   said detector system comprising
      a standing pilot.

12. The portable heater according to claim 11, further comprising:
a fan.

13. The portable heater according to claim 12, further comprising:
a power source adapted to provide sufficient power to operated said fan.

14. The portable heater according to claim 13, wherein said housing is adapted to at least partially enclose a fuel source.

15. The portable heater according to claim 14, wherein said regulator adapted to limit the pressure of fuel passing therethrough to approximately eleven inches water column.

16. The portable heater according to claim 15, wherein said heater comprises:
an igniter.

17. The portable heater according to claim 16, wherein said fuel source comprises:
an LP gas supply, a removable canister, or a propane fuel tank.

18. The portable heater according to claim 17, wherein said radiant surface comprises:
a burner tile or multi-ply screen.

19. The portable heater according to claim 18, wherein said housing comprises a shield or grid adapted to provide protection to the heater components.

20. The portable heater according to claim 19, wherein said controller has continuously variable positions for infinitely variable heating.

* * * * *